Feb. 19, 1935.  L. A. TAYLOR  1,991,474
RADIO BEACON SYSTEM
Filed June 23, 1933    2 Sheets-Sheet 1

Inventor:
Laurens A. Taylor,
by Harry E. Dunham
His Attorney.

Feb. 19, 1935.　　　　L. A. TAYLOR　　　　1,991,474
RADIO BEACON SYSTEM
Filed June 23, 1933　　　2 Sheets-Sheet 2
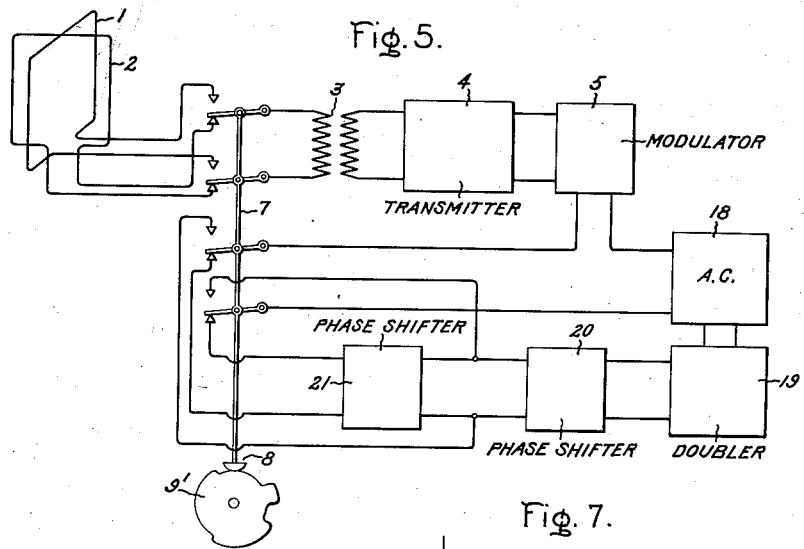
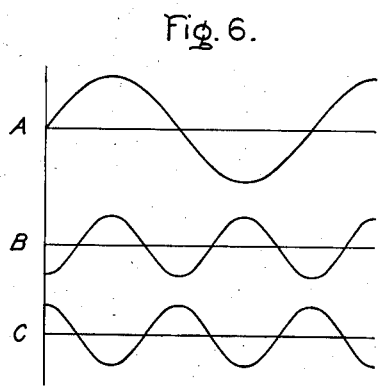
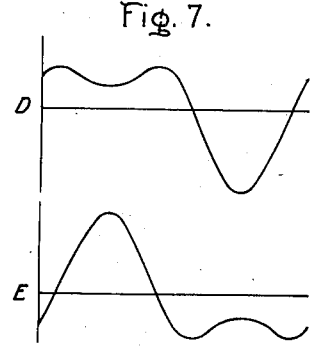
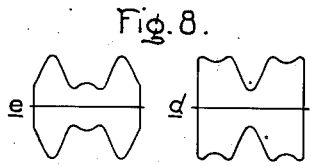
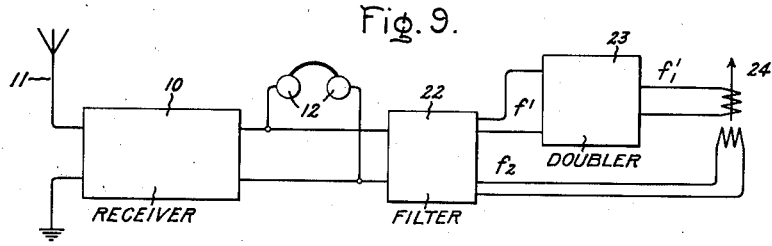
Inventor:
Laurens A. Taylor,
by Harry E. Dunham
His Attorney.

Patented Feb. 19, 1935

1,991,474

UNITED STATES PATENT OFFICE 1,991,474

RADIO BEACON SYSTEM

Laurens A. Taylor, Schenectady, N. Y., assignor to General Electric Company, a corporation of New York Application June 23, 1933, Serial No. 677,225

11 Claims. (Cl. 250—11)

My invention relates to radio beacon course systems for guiding vehicles and mobile craft, such as ships and aircraft, along a predetermined course, and more particularly to the type which provides both aural and visual indications.

In guiding moving craft along a radio beacon course, it is very desirable that the radio beacon system provide both aural and visual indications. It has been customary to provide visually indicating beacon course systems by directive radio transmission such that there is present on one side of the course, one type of radio wave; on the other side of the course, another type of radio wave; and on the course, a combination of these waves. Also, it has been customary to provide aurally indicating beacon course systems by directive radio transmission wherein impulses forming the letter A are transmitted on one side of the beacon course and impulses forming the letter N are transmitted on the other side of the beacon course. On the course, these impulses of the letters combine to form long dashes. These systems however do not provide simultaneously aural and visual indications.

It is an object of my invention to provide a radio beacon course transmitter which will provide both aural and visual indications.

A further object of my invention is to provide a receiving system for cooperation with such directive radio transmitters whereby the received impulses may be translated to produce aural and visual indications.

Figure 1:
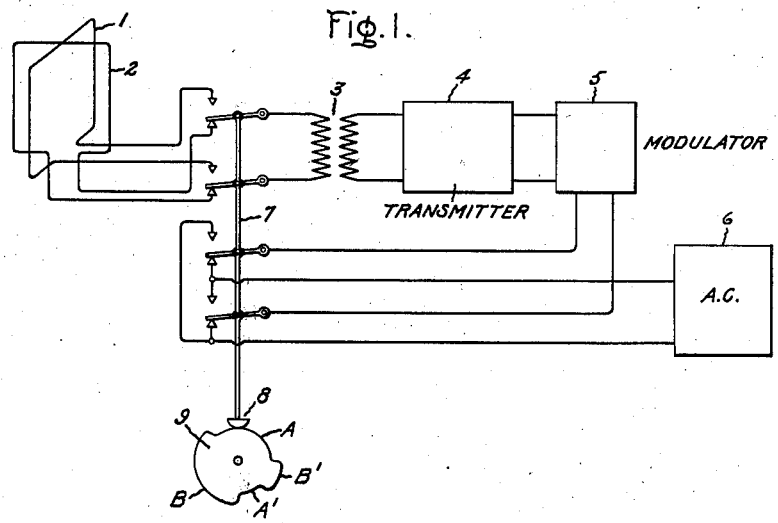
Figure 2:
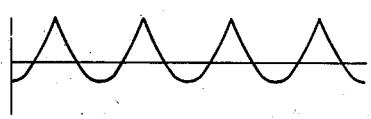
Figure 3:
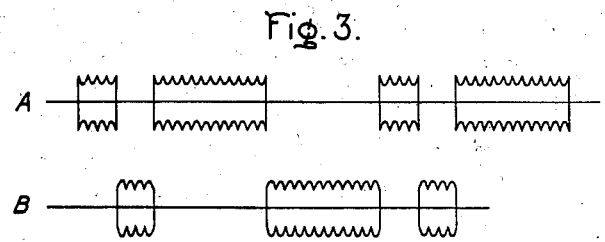
Figure 4:
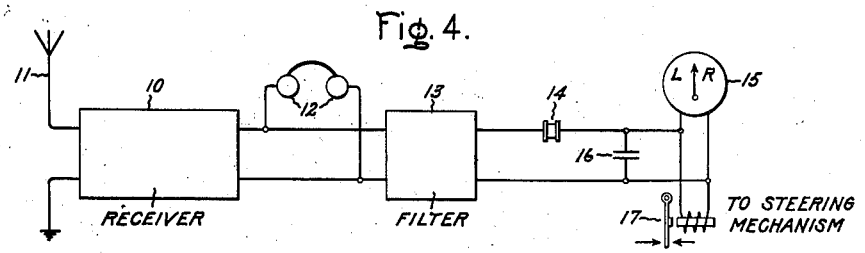

The novel features, which I believe to be characteristic of my invention, are set forth with particularity in the appended claims. My invention itself however, both as to its organization and method of operation, together with further objects and advantages thereof, will be understood best by reference to the following description taken in connection with the accompanying drawings in which Fig. 1 illustrates a transmitter arrangement utilized in my invention; Figs. 2 and 3 show certain characteristics of its operation; Fig. 4 discloses a receiver for cooperation with the transmitter; Fig. 5 discloses an alternative transmitter arrangement; Figs. 6, 7, and 8 show characteristics of the transmitter of Fig. 5; and Fig. 9 discloses a receiver for cooperation with the transmitter shown in Fig. 5.

Referring to Fig. 1 of the drawings I have illustrated therein an antenna system comprising two directive antennæ 1 and 2 arranged at right angles to each other thereby to radiate oscillations in directions at right angles to each other to produce the well-known figure 8 radiation patterns at right angles to each other. It will, of course, be understood that any other system of antennæ may be employed which produces a similar radiation pattern. These antennæ 1 and 2 are connected through a coupling means 3 to a carrier wave transmitter 4. The transmitter 4 is provided with a modulating means 5 which is connected to a source of asymmetrical alternating current 6. A four-pole, double-throw switch 7 is provided for alternately connecting the transmitter 4 to the antennæ 1 and 2 and for simultaneously reversing the connections of the asymmetrical wave source 6 to the modulator 5. The switch system shown is merely exemplary of any number of systems which may be utilized to obtain similar effects. The switch 7 is provided with a cam follower 8, which rides upon a rotary cam 9. The cam 9 may be of any desired shape, but in the instance shown, is of such shape that impulses forming the letters A and N are transmitted from the antennæ, 1 and 2, so that a receiver on the course will produce a continuous aural indication.

Fig. 2 shows an asymmetrical wave form which may be supplied by the alternating current source 6. This wave may be obtained by any one of a number of ways as, for example, by passing the alternating-current wave through an electron discharge amplifier biased negatively to anode current cut-off so that one-half of the alternating-current wave is distorted to produce peak voltages of one polarity exceeding those of the opposite polarity. The carrier wave impulses produced by the transmitter 4, when modulated with the asymmetrical wave shown, have envelopes such as shown in Fig. 3. The impulses disclosed at A are obtained when the cam follower 8 is riding upon the portions A and A' of the cam 9. When the cam follower 8 is riding upon the portions B and B', the envelope of the modulated carrier wave impulse is similar to that shown in Fig. 3 at B. Since the switch 7, actuated by the cam 9, reverses the connections of the asymmetrical wave source to the modulator, the carrier wave is modulated with a wave form which is the same as that shown in Fig. 2, but inverted with the result that the envelope of the modulated carrier impulse when the cam follower is riding upon the surfaces B and B' is as shown in Fig. 3 at B.

In Fig. 4, I have shown a receiver 10 connected to a suitable antenna 11 for receiving the directive impulses radiated from the antennæ 1 and 2 of the transmitter disclosed in Fig. 1. The output circuit of the receiver 10 is provided with a pair of headphones 12 for aural indication of the transmitted impulses. The output of the receiver is also provided with a filter 13 which is connected to a circuit having therein a non-linear resistor 14 and a zero center direct-current meter 15. The filter 13 is arranged to prevent currents other than those resulting from the demodulation of the carrier wave impulses from entering the circuit wherein the non-linear resistor and the direct-current meter are employed. A by-pass capacitor 16 is connected across the meter 15 so that any remaining alternating-current components are prevented from entering the direct-current meter.

The non-linear resistor 14 is preferably of the type described in the United States Patent No. 1,822,742 issued September 8, 1931, to McEachron, but may be composed of any other material or combination of elements which will provide the desired non-linear resistance current characteristic. An example of such an arrangement would be two copper oxide rectifiers of the type described in the United States Patent No. 1,640,335 issued August 23, 1927, to Lars O. Grondahl, which are connected in parallel and arranged opposite to each other so as to produce a bilaterally conducting path. The non-linear resistor of the type shown in the patent to McEachron, which is commercially known as "Thyrite" has a resistance and current relationship which can be expressed in the form of a simple hyperbolic equation $R=CI^{-a}$, where R is the resistance, I is the current, and C and $a$ are constants. The exponent $a$ is generally less than unity and the constant C is preferably between 20 and 600. This material has a peculiar property of acting substantially instantly to asymmetrical wave shapes having peak voltages of one polarity greater than the peak voltages of opposite polarity so that unidirectional current flows in the circuit, but when symmetrical waves are passed through it no direct-current flow occurs.

The operation of my invention is as follows: If for instance the craft upon which the receiver 10 is mounted deviates to one side of the beacon course, the impulses, such as shown at A in Fig. 3, may predominate in the input circuit of the receiver. These impulses, when demodulated in the receiver, produce an asymmetrical wave in the output circuit of a form such as shown in Fig. 2, which is transmitted to the headphones 12 to produce the aural signal A and is also transmitted through the filter 13 to the non-linear resistor 14. The non-linear resistor 14 reacts to these waves causing a unidirectional current to flow through the meter 15 and having a polarity depending upon the asymmetry of the wave. If the craft deviates to the other side of the course, the impulses predominating in the input circuit of the radio receiver 10 are of the form shown at B in Fig. 3. These impulses upon demodulation will produce a wave similar to that shown in Fig. 2, but of inverted form. This demodulated wave is transmitted to the headphones to produce the aural signal N. This wave when acted upon by the non-linear resistor 14 will cause a unidirectional current to flow through the meter 16 having a polarity opposite to that current flowing in the previous instance.

When the craft upon which the receiver 10 is mounted is exactly upon the course, equal signals of the forms shown in Fig. 3 are received and these signals upon demodulation produce a continuous tone in the headphones 12. The wave resulting from the demodulation of these signals is alternately of the form disclosed in Fig. 2 and of that form inverted. When these asymmetrical currents reach the non-linear resistor 14, direct-current impulses of alternate polarities are produced and these impulses flowing through the meter 15 constitute an average direct current which maintains the indicator at zero. Due to the impulse character of the direct currents however the indicator 15 may be vibrated slightly by equal amounts on opposite sides of the zero position when the craft is on the course. While this vibration is not objectionable, if desired, a suitable damping means may be provided for reducing or preventing it. The direct currents resulting from the receiver when the craft is off the course causes the indicator 15 to indicate that the craft is to the right or left of the course as the case may be.

The direct currents resulting from the action of the non-linear resistor 14 may be applied to a system for automatically steering the craft so as to return the craft to the center of the course. This is indicated in the drawings by the polar relay 17 and the legend "To steering mechanism". Direct currents of different polarities will cause the armature of the relay 17 to be drawn to either the right or left contacts, thereby causing the rudder of the craft to be operated in a corresponding manner. Suitable systems for automatically controlling the rudder are disclosed in copending applications, Serial No. 550,974, of Ernst F. W. Alexanderson, filed July 15, 1931, entitled "Automatic steering system", and Serial No. 556,605 of Howard I. Becker, filed August 12, 1931, entitled "Automatic steering system", which are assigned to the same assignee as my present application. Such systems generally utilize a relay arrangement which operates to control a motor and suitable clutches for causing the rudder to be turned to the right or left, thereby steering the craft toward the course.

An alternative transmitter arrangement is disclosed in Fig. 5 wherein parts similar to the transmitter disclosed in Fig. 1 have similar reference characters. The form of alternating currents applied to the modulator in this transmitter however is different from that supplied to the modulator in the previous transmitting arrangement. A source of symmetrical alternating current 18 is provided. A portion of the voltage from this source is fed into a frequency doubler 19. The frequency doubler is connected to a plurality of phase shifters 20 and 21. The switch 7, in the position shown, connects the output of the frequency doubler through two phase shifters in series with the alternating-current source 18. When the switch 7 is in the upper position, the output of the frequency doubler 19 is connected so that only the phase shifter 20 is in series with the alternating-current source 18. The cam 9', as shown in this instance, is arranged to transmit groups of A and N signals instead of a continuous series of A and N signals as shown in Fig. 1.

Fig. 6 shows the phase relation between currents in the output circuits of the alternating-current source 18, the phase shifter 20, and the phase shifter 21, and also the resultant waves impressed upon the modulator 5 dependent upon the positions of the switch 7. The curve disclosed at A in Fig. 6 represents the alternating current produced by the source 18. The wave shown at B discloses the phase relation of the second harmonic of the wave A as it appears in the output circuit of the phase shifter 20, whereas the curve C discloses the second harmonic and its phase relation as it appears in the output circuit of the phase shifter 21. When the wave of the fundamental frequency A is combined with the second harmonic wave B displaced in phase relationship to the fundamental A, as shown, the resultant wave is similar to that disclosed in Fig. 7 at E. If the fundamental wave such as A however is combined with a second harmonic wave having a phase relation such as shown at C, then the resultant wave is similar to that shown in Fig. 7 at D. It is therefore apparent from these curves that the resultant waves impressed upon the modulator 5 are asymmetrical waves having wave forms such as shown at D and E in Fig. 7. When the switch 7 is in the position shown, the resultant wave impressed upon the modulator 5 is similar to that indicated at E and the envelope of the carrier wave so modulated is similar to that shown in Fig. 8 at e. When the switch 7 is in the upper position, the wave impressed upon the modulator 5 is similar to that indicated in Fig. 7 at D, and the carrier wave of the transmitter when so modulated has an envelope similar to that disclosed in Fig. 8 at d.

The receiver disclosed in Fig. 4 may be used to receive the impulses transmitted from the transmitter described above and shown in Fig. 5. The receiver of Fig. 4 will cooperate with this transmitter in a manner similar to that described in connection with its cooperation with the transmitter disclosed in Fig. 1. The arrangement described in connection with Fig. 5 is merely an alternative manner of obtaining the asymmetrical wave which is modulated upon the carrier-current impulses so as to produce impulses having a normal envelope and an envelope inverted with respect to the normal envelope.

In Fig. 9, I have disclosed an alternative receiver arrangement for receiving the directive impulses radiated from the transmitter shown in Fig. 5. The output of the receiver 10 is provided with a pair of headphones 12 for aural indication of the transmitted impulses. The output of the receiver 10 is also provided with a frequency filter 22 which serves to separate the fundamental frequency from the second harmonic. The fundamental frequency obtained from the filter 22 is fed to the frequency doubler 23, the output of which is connected to one coil of an indicating instrument 24. The second harmonic obtained from the filter 22 is connected to the other coil of the instrument 24. The instrument 24 is of the type which produces an indication dependent upon the phase relation between the currents flowing in the two actuating coils.

The operation of the receiver disclosed in Fig. 9 is as follows: When the craft upon which the receiver 10 is mounted deviates to one side of the beacon course, impulses such as shown at e in Fig. 8 may predominate in the output of the receiver. These impulses when demodulated in the receiver produce an asymmetrical wave which is of the form disclosed at E in Fig. 7. It will be remembered that the wave form so disclosed is composed of the fundamental wave A and the second harmonic wave B. This wave, now present in the output circuit of the receiver 10, is fed into the filter 22 which separates the fundamental component from the second harmonic component. The fundamental component $f_1$, which is similar to the wave A of Fig. 6, is fed into the frequency doubler 23 which produces in its output circuit a wave having double the frequency of the wave disclosed at A in Fig. 6. A second harmonic component $f_2$, which is similar to the wave B of Fig. 6, is transmitted to the other actuating coil of the instrument 24. It will be apparent that the double frequency $f_1'$ has a certain phase relation to the second harmonic frequency $f_2$, which will result in an indication of the instrument 24. This indication of the instrument 24 informs the pilot of the craft that the craft has deviated to the right or left of the course as may be the case. If, for instance, the craft deviates to the other side of the course, the impulses predominating in the input circuit of the receiver 10 will be of the form disclosed at d in Fig. 8. These impulses, when demodulated in the receiver, produce an asymmetrical wave having a shape similar to that at D in Fig. 7. Such a wave is composed of a fundamental wave A and a second harmonic wave C having a certain phase relation to the fundamental wave A. This wave D is transmitted to the filter 22 which separates the fundamental and second harmonic components which are transmitted to an indicating meter 24 and the frequency doubler 23. The fundamental frequency when doubled is also transmitted to the indicating meter 24. The indication of the meter 24 in this instance however will be opposite in nature to that produced in the previous instance.

When the craft upon which the receiver 10 is mounted is exactly on the course, equal signals of the forms disclosed in Fig. 8 are received in the input circuit of the receiver 10. These signals when demodulated produce in the output circuit of the receiver 10 alternating-current impulses having wave shapes such as shown at D and E in Fig. 7. These wave shapes when passed through the filter 22 and the frequency doubler 23 produce in the actuating coils of the indicating meter 24 an average alternating-current torque which with suitable damping maintains the indicator substantially at zero. This indicates to the pilot of the craft that the craft is upon its course.

While I have shown and described my invention in connection with certain specific embodiments, it will of course be understood that I do not wish to be limited thereto, since it is apparent that the principles herein disclosed are susceptible to numerous applications, and modifications may be made in the circuit arrangement or in the instrumentality employed without departing from the operation and scope of my invention as set forth in the appended claims.

What I claim as new and desire to secure by Letters Patent of the United States, is:

1. In a radio beacon course system, a plurality of directive antennæ, a source of asymmetrical alternating current, a source of high frequency energy, means for modulating said high frequency energy with said asymmetrical current, means for connecting periodically said source of asymmetrical current to said modulating means in a manner to produce periodically high frequency energy having a normal modulation envelope and periodically high frequency energy having said modulation envelope inverted, and means for alternately supplying said modulated energy to said antennæ, said last two means operating simultaneously and at intervals such that said high frequency energy modulated in accordance with said respective normal and inverted envelopes are radiated by the corresponding directive antennæ during intervals of different character.

2. The combination in a system for guiding craft along a predetermined course, of means for radiating on one side of said course energy modulated with an asymmetrical wave having peak voltages of one polarity greater than peak voltages of the opposite polarity, and radiating on the other side of said course energy modulated with an asymmetrical wave having the polarity of the greater peak voltages opposite to those of said first asymmetrical wave, a radio receiver on a moving craft for receiving and demodulating said radiant energy, an output circuit for said receiver including a non-linear resistance, the demodulation products being supplied to said output circuit, and a polarity responsive device connected to respond to the unidirectional current flowing in said non-linear resistance whereby the response produced by said polarity responsive device is dependent upon the position of the craft relative to said predetermined course.

3. A radio beacon course system comprising a directive transmitter including a source of high frequency current, means for modulating said high frequency current with an asymmetrical current, means for controlling said modulation means and said transmitter to radiate on one side of a predetermined course high frequency current having a normal modulation envelope and to radiate on the other side of said course high frequency current having modulation envelope inverted with respect to said first envelope, a radio receiver for receiving and demodulating said modulated high frequency currents, an output circuit for said receiver including a non-linear resistance, the demodulation products being supplied to said output circuit, and indicating means connected in series with said non-linear resistance to indicate the position of said receiver relative to said predetermined course.

4. The combination with a radio beacon course transmitting system having radiant energy on one side of a predetermined course modulated with an asymmetrical wave and radiant energy on the other side of said course modulated with an asymmetrical wave inverted with respect to said first asymmetrical wave, of a radio receiver on a movable craft for receiving said radiant energy, an output circuit for said receiver having a non-linear resistance characteristic, said output circuit translating the output currents of said receiver to produce unidirectional current dependent upon the asymmetry of the modulation of the received wave, and means for producing distinctive responses in accordance with said unidirectional currents.

5. The combination with a radio beacon course transmitting system having radiant energy modulated with an asymmetrical wave of one shape and radiant energy modulated with an asymmetrical wave of a different shape, said modulated energies being on opposite sides of a predetermined beacon course, of a radio receiver mounted on a movable craft for receiving said radiant energy, an output circuit for said receiver including a non-linear resistor, said non-linear resistor operating to produce unidirectional current whenever said craft deviates sufficiently from said course to cause one of said modulated energies to be predominant in said receiver, said unidirectional current having a polarity dependent upon the asymmetry of said modulations, and means responsive to said unidirectional current whereby said craft may be steered toward said course.

6. A radio beacon course system comprising a directive transmitter including a source of high frequency current, a source of asymmetrical alternating current, means for modulating said high frequency current with said asymmetrical current, means for controlling said modulation means and said transmitter to radiate on one side of a predetermined course high frequency current having a certain modulation envelope and to radiate on the other side of said course high frequency current having said certain modulation envelope inverted, a radio receiver for receiving said modulated high frequency currents, an output circuit for said receiver, non-linear resistance means connected in said output circuit for translating the output current of said receiver to produce unidirectional current having a polarity dependent upon the asymmetry of the modulations of the received wave, and means for producing distinctive responses in accordance with said unidirectional current.

7. A radio beacon course system comprising a directive transmitter including a source of high frequency current, a source of low frequency current, a second source of low frequency current being of a frequency which is an even multiple of said first low frequency, means for selectively shifting the phase between said low frequency currents, means for controlling said phase shifting means and said transmitter whereby high frequency energy modulated with low frequency currents having a particular phase relation to each other is radiated and high frequency energy modulated with low frequency currents having a different phase relation is radiated, said modulated high frequency energies being radiated upon opposite sides of a predetermined course, a radio receiver for receiving and demodulating said modulated high frequency currents mounted upon a movable craft, said receiver including means for reducing the received first mentioned low frequency currents to currents of equal frequency with said currents of multiple frequency, and means responsive to the phase relation between said currents of equal frequency.

8. The combination in a system for guiding craft along a predetermined course, of means for radiating periodically on one side of said course energy modulated with an asymmetrical wave and periodically radiating on the other side of said course energy modulated with an asymmetrical wave having maximum voltage peaks of opposite polarity to those of said first asymmetrical wave, a radio receiver on a moving craft for receiving said radiant energy, an output circuit for said receiver including means for translating the output currents thereof to produce distinctive aural responses dependent upon the periodic energy radiations and means for translating the output currents thereof to produce distinctive responses dependent upon the asymmetry of the modulation of the received wave.

9. A radio beacon course system comprising a directive transmitter including a source of high frequency current, means for modulating the said high frequency current with an asymmetrical current, means for controlling said modulation means and said transmitter to radiate periodically upon one side of a predetermined course high frequency impulses having a normal modulation envelope and to radiate periodically on the other side of said course high frequency current impulses having a modulation envelope inverted with respect to said first envelope, a radio receiver for receiving and demodulating said modulated high frequency currents, an output circuit for said receiver including means for producing distinctive responses dependent upon the time duration of said high frequency impulses, and means for producing distinctive responses dependent upon the asymmetry of said demodulated currents.

10. A radio beacon course system comprising a directive transmitter including a source of high frequency current, a source of low frequency current, a second source of low frequency current having a frequency which is an even multiple of said first low frequency, means for selectively shifting the phase between said low frequency currents, means for controlling said phase shifting means and said transmitter whereby high frequency energy impulses modulated with low frequency currents having a particular phase relation to each other are radiated and high frequency energy impulses modulated with low frequency currents having a different phase relation are radiated, said modulated high frequency impulses being radiated on opposite sides of a predetermined course, a radio receiver for receiving said modulated high frequency currents, an output circuit for said receiver including means for translating said impulses to produce distinctive aural responses, and means for translating the phase relations between the modulations received to produce distinctive responses in accordance with said phase relations.

11. In combination, a pair of directive radiating systems oriented in different directions, a carrier wave transmitter, a source of distorted wave modulating current connected to said transmitter, a switching means for alternately connecting said carrier wave source to said radiating systems and for simultaneously reversing the phase of said distorted wave modulating current, and means to operate said switching means in accordance with predetermined codes corresponding to the different radiating systems.

LAURENS A. TAYLOR.